Sept. 13, 1927.

C. F. KETTERING ET AL 1,642,034

SYSTEM OF ELECTRICAL DISTRIBUTION AND CONTROL

Original Filed Sept. 14, 1916

Witnesses

Inventors
Charles F. Kettering
William A. Chryst
Kerr, Page, Cooper and Hayward
Attorneys Patented Sept. 13, 1927.

1,642,034

UNITED STATES PATENT OFFICE.

CHARLES F. KETTERING AND WILLIAM A. CHRYST, OF DAYTON, OHIO, ASSIGNORS, BY MESNE ASSIGNMENTS, TO DELCO-LIGHT COMPANY, OF DAYTON, OHIO, A CORPORATION OF DELAWARE.

SYSTEM OF ELECTRICAL DISTRIBUTION AND CONTROL.

Application filed September 14, 1916, Serial No. 120,098. Renewed September 30, 1921. Serial No. 504,499.

This invention relates to improvements in the control of electrical systems, and more particularly to that type of system which includes an electric unit and an engine adapted to drive said unit, and also to be driven thereby.

One of the objects of the present invention is to provide a system of the above mentioned type, wherein an engine and electric unit are controlled as to some of their operations, by certain conditions of the devices which comprise the electric unit and the engine.

One manner in which the above may be carried out, is to provide mechanism which, when operated by the attendant, will connect the electric unit with the source of current, preferably a storage battery, and cause said electric unit to operate as a motor and thereby crank the engine.

This same electric unit, however, will tend to operate as a generator as soon as the engine becomes self-actuating, and certain of the devices associated with the electric unit will be brought into effect by the electrical condition of said electric unit to automatically control the circuit connections between said unit and the battery, so as to maintain these connections closed during the operation of the engine.

Provisions are also included in this system so that if abnormal electrical conditions are present, the controller switch element will automatically tend to discontinue the closed circuit connections and thereby stop or slow down the operation of the engine. These provisions may include the ignition circuit and tend to open said circuit, when the controller device is actuated to release the circuit connections from closed position.

Further objects and advantages of the present invention will appear hereinafter, reference being had to the accompanying drawings, wherein a preferred form of one embodiment of the present invention is clearly set forth.

In the drawings:—

Figure 1:
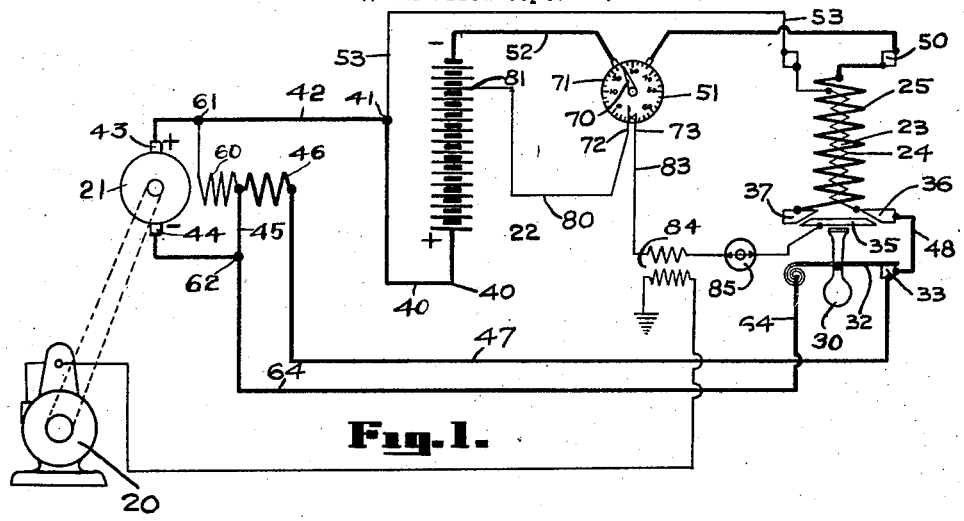
Fig. 1 is a diagrammatic view of one form of the present invention, including the engine, electric unit and the controlling device.

Referring to the drawings, and more particularly to diagrammatic Fig. 1, it will be noted that there is illustrated a power plant, including an engine 20, which may be of any suitable type, but which in the present instance is shown as being of the single cylinder type. This engine is connected to an electric machine 21, in any suitable manner.

This electric machine is capable of operation either as a motor or as a generator, and is adapted when operating as a motor to crank said engine and to effect the starting thereof, while after said engine has become self-actuating this electric machine will be driven as a generator to furnish current for charging the battery 22, or supplying power to any other work devices.

The electric machine has been clearly described, illustrated and claimed in our copending Patent No. 1,341,327, issued May 25, 1920. This machine is preferably so wound that when operating as a motor for starting purposes, it operates as a compound-wound machine, while when it is operating as a generator, it operates as a shunt-wound machine.

Figures 2, 3:
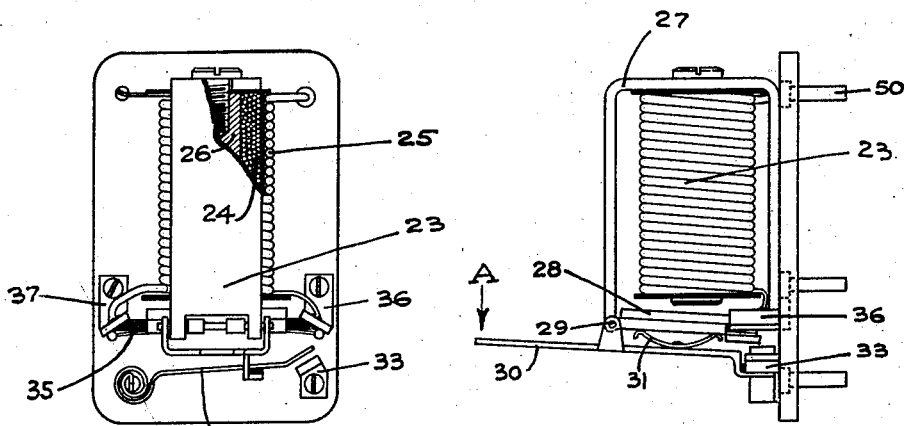
Figs. 2 and 3 are detailed views of the electric circuit controller.

The electric machine is controlled by means of an electric controller switch 23, which, as will be seen by referring to Figs. 2 and 3, comprises a low resistance coil 25, and a high resistance coil 24, suitably wound upon a core 26. These windings, together with the core 26, constitute an electro-magnet which is mounted upon the frame 27, in any suitable manner.

An armature 28 is pivotally mounted on the frame 27, as at the point 29, and is normally in the position shown in Fig. 3. Arranged directly below the armature 28 an operating element or handle 30 is provided, also being pivoted to the frame 27 as at 29. This handle 30 is provided with a spring 31, which is normally in engagement with the armature 28.

In the operation of the present system, as will be described more in detail hereinafter, this handle 30 is manually actuated by the attendant of the system, to move the armature 28 into such position as to close certain circuit connections, and the spring 31 is provided so that if undue pressure is applied to the handle 30, this spring will absorb the excess pressure and prevent injury to the other parts of the controller.

The handle 30 is also associated with the spring contact plate 32 (see Fig. 2). This plate 32 is normally in contact with contact plate 33, which, as is described hereinafter, is connected to one side of the series field winding of the electric machine.

Supposing that the engine 20 is at rest and it is desired to bring the system into operation. The attendant will exert pressure on the handle 30, in the direction of the arrow "A" (see Fig. 3), which will tend to force the armature 28 of the controller switch into such a position that the contact plate 35 will be forced against the plates 36 and 37, and the contact plate 32 will be thrown out of circuit closing position with the plate 33.

This will permit the flow of current from the positive side of the battery 22, through conductor 40, to the point 41. At this point a portion of the current will pass through the conductor 42, to the positive brush 43 of the electric machine. Thence across the armature to the negative brush 44, through conductor 45, series windings 46, conductor 47, to contact plate 33, and thence through the wire 48 to contact plate 36. From this point the current passes through the contact plate 35, to the contact plate 37, thence through the low resistance or series coil 25 of the circuit controller to the conductor 50, thence through the ampere-hour-meter 51, to the conductor 52, back to the negative side of the battery.

It has been described, that the main flow of current divides at the point 41 of conductor 40, a portion thereof passing through conductor 53, to the high resistance or shunt coil 24 of the circuit controller, thence to the contact plate 36, where it will again merge with the main flow of current, passing through contact plate 35 and low resistance coil 25, back to the negative side of the battery through the circuit heretofore described.

The magnetic effect of the flow of current through the low resistance or series coil 25, during the starting operation, is opposed to the magnetic effect of the flow of current through the high resistance or shunt coil 24, so that if the attendant releases pressure from the handle 30, the armature will not remain in circuit closing position, but will return to its normal position and thereby break the main circuit between the battery and electric machine.

It will therefore be seen that if for any reason the attendant releases pressure from the handle 30, there will be no further flow from the battery to the electric machine. This constitutes a protective device, in view of the fact that if the armature 28 remained in attracted position, and the engine should not become self-actuating, due possibly to the exhaustion of the fuel supply, or for any other reason, current from the battery would continue to flow through the electric machine and operate the same as a motor, until the entire current supply of the battery was exhausted.

It has also been explained heretofore, that the electric machine when operating as a motor, operates as a compound wound machine, that is, the series winding 46 and the shunt winding 60 are accumulative in effect.

By referring to Fig. 1 of the drawing, it will be noted that the shunt winding 60 is connected to the conductor 42 as at 61, while the other terminal of the windings 60 is connected to the conductor 45 at the point 62, which is equivalent to connecting it directly to the positive and negative commutator brushes.

As soon as the engine becomes self-actuating, it will tend to drive the electric machine as a generator, and current will then flow from the positive brush 43, through conductors 42 and 40 to the positive side of the battery, across the battery, through the ampere-hour-meter 51 in the opposite direction to that when the electric machine is operating as a motor, thence through the conductor 50, to the low resistance or series coil 25 of the circuit controller. From this coil, the current will pass through the contact plate 37, common contact plate 35, contact plate 36, wire 48, to contact plate 33, spring contact plate 32, to conductor 64, to the negative brush 44 of the electric machine.

Current from the positive brush of the electric machine also passes from the point 41 of conductor 42, through the conductor 53 to the high resistance or shunt coil 24 of the controller device, and thence to the contact plate 36 where it joins the current from the low resistance or series coil 25 and passes through wire 48 back to the negative brush of electric machine by the path already described. It will be observed that the flow of current through the low resistance or series coil 25 is now opposite in direction to what it was during the starting operation, so that its magnetic effect now supplements that of the high resistance or shunt coil 24 with the result that the armature 28 is held in attracted position and the contact plate 35 carried thereby is held in circuit closing position by the controlling device.

From a consideration of the foregoing it should be clear that during the starting operation, when the circuit at 32—33 is open, the series field winding 46 is effective so that the electric machine operates as a motor with series characteristics. When the electric machine operates as a generator (due to the self-actuation of the engine) and begins to charge the battery, it likewise operates with series characteristics so long as the attendant presses on handle 30 and holds spring contact plate 32 out of engagement with contact plate 33, but as soon as pressure on handle 30 is removed contact plates 32 and 33 come into engagement to short circuit the series winding 46 thereby causing the generator to assume shunt characteristics. If the attendant now releases the handle 30 of the controlling device, the contact plate 35 will be held in its circuit closing position by the magnetic action of the controlling device, as above explained, but the spring contact plate 32, which is not held by the magnetic action of the controlling device, will fall away returning to its original position in contact with the contact plate 33. When in this position (Fig. 1) it will be seen that the circuit from point 62 to contact plate 33 through conductor 64 and spring contact plate 32, is in parallel with the circuit through conductor 45, series field winding 46 of the electric machine, and conductor 47, that is, the first-mentioned circuit short circuits the series field winding 46 and renders it inoperative.

The shunt field circuit is apparent by referring to Fig. 1, one terminal thereof being connected to the conductor 64 at the point 62, while the opposite terminal is connected to the conductor 42 at the point 61.

From the foregoing description it will be noted that all of the current flowing to or from the battery 22, will pass through the measuring instrument 51, which in the present improvements includes an ampere-hour-meter. This meter includes a hand 70, which is adapted to move over the dial in accordance with the amount of current passing to or from the battery. Certain mechanisms are connected with this hand which tend to actuate in accordance with the amount of current and the direction of flow thereof in the movement of this hand. That is, when sufficient current has passed from the electric machine through this instrument to effect a complete charging of the battery, the hand 70 will have moved over the dial 71 into position to engage with the contact plate 72, and will have moved this contact plate away from contact plate 73. These contact plates 72 and 73 are directly in the ignition circuit, so that as soon as these contacts are separated, the ignition circuit will be broken, and the engine, deprived of ignition, will therefore be brought to a stop. It will be observed that when the ignition circuit is broken by the ampere-hour meter, as above explained, the engine begins to slow down and as soon as the voltage of the dynamo falls below that of the battery there is a counter-rush or flow of current from the battery to the dynamo which causes the automatic controller switch 23 to disconnect the battery from the dynamo in the manner already described.

The ampere hour meter 51 as employed in the present system is in its essential character a means for determining the state of charge of the battery. Its initial setting is made by hand to agree with the state of charge of the battery at that time and when it is thus set or placed in step with the battery it indicates and measures the amount of current required to bring the battery up to full charge, and when that amount of current has been supplied to the battery during the charging operation it operates automatically to stop the engine as already described. It will be apparent from the foregoing that any suitable or equivalent means for determining the state of charge of the battery may be employed which is a measure of the amount of charging current or engine operation required to bring the battery up to full charge and which stops the engine when, according to its indication, the battery is fully charged.

As is illustrated in Fig. 1, this ignition circuit does not include the entire battery 22, but may be so connected with the battery that the voltage of the ignition system will be less than the total voltage of the battery 22.

The circuit connections for the ignition system are as follows: The conductor 80 is tapped from one of the positive plates 81 of the battery 22, and is connected directly to contact plate 72, which is associated with the ampere-hour-meter 51. This plate 72 is normally in contact with contact plate 73, which in turn is connected to the conductor 83. An induction coil 84, including the ordinary primary and secondary windings, has its primary winding connected to one end of the conductor 83, while the opposite end of the primary winding is connected to the timer or make and break device 85. This timer in turn is connected to the movable contact plate 35, which is associated with the armature 29 of the controller switch.

Now, when the movable switch element or handle 30 is in circuit closing position, the ignition circuit is completed through the low resistance or series coil 25, conductor 50, thence through the meter 51 back to the negative side of the battery, via conductor 52.

As has been explained heretofore, if the engine does not become self-actuating when it is being cranked by the operation of the electric machine acting as a motor, and the operator or attendant releases the pressure on the handle 30 of the controller switch, the movable contact plate 35 will return to its normal circuit breaking position and not only dis-establish the main charging circuit between the electric machine and the battery, but will also dis-establish the ignition circuit.

Again, if the voltage or potential across the terminals of the electric machine becomes less than the voltage across the terminals of the storage battery, during the charging operation, current will immediately tend to flow from the battery through the low resistance or series coil 25 of the controller switch, in such a direction that it will effect a change in polarity of the electro-magnet 23, and thereby throw the armature 28 of the controller switch together with the movable contact plate 35 into circuit breaking position. This will also effect a break in the ignition circuit as well as in the main charging circuit, and cause the engine to stop, thereby stopping the operation of the electric machine, until the operator or attendant again actuates the controller switch manually.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

Having described our invention what we claim is as follows:

1. In an electrical system, the combination with an engine; of a dynamo having a plurality of field circuits and capable of operation as a motor for starting the engine or as a generator with certain of the field circuits operative; a storage battery; manually controlled means for connecting the dynamo with the storage battery and for bringing other of the field circuits into effective operation in order that the dynamo may operate as a high torque motor; and provisions cooperating with said means for maintaining the circuit connections between the dynamo and battery when the dynamo output exceeds a certain amount, while permitting said other field circuits to be rendered ineffective.

2. In an electrical system, the combination with an engine; of a dynamo having a plurality of field circuits and capable of operation as a motor for starting the engine or as a generator with certain of the field circuits operative; a storage battery; and a controller including manually operable means for connecting the battery with the dynamo and for bringing other of the field circuits in effective operation in order that the dynamo may operate as a high torque motor, said controller including automatic means for maintaining the dynamo connected with the battery when the dynamo output exceeds a certain amount while permitting certain of the field windings to be rendered ineffective.

3. In an electrical system, the combination with an engine; of a dynamo having series and shunt field windings; a storage battery; and a controller including manually operable means for connecting the battery with the dynamo and for bringing the series field into effective operation in order that the dynamo may operate as a high torque motor to start the engine, said controller including automatic means for maintaining the connection with the battery and dynamo when the dynamo output exceeds a certain amount while permitting the series field winding to be rendered ineffective.

4. In an electrical system, the combination with an engine; of a dynamo having a shunt winding and a normally short-circuited series field winding; a storage battery; and a controller including manually operable means for connecting the battery with the dynamo and for interrupting the short circuit around the series field winding in order that the dynamo may operate as a high torque motor to start the engine, said controller including automatic means for maintaining the connection with the battery and dynamo when the dynamo output exceeds a certain amount while permitting the series field to be short circuited.

5. In an electrical system, the combination with an engine; of a dynamo having a plurality of field circuits and capable of operation as a motor for starting the engine or as a generator with certain of the field circuits operative; ignition apparatus for the engine; a current source; and a controller including manually operable means for connecting the current source with the ignition apparatus and with the dynamo and for bringing other of the field circuits into effective operation in order that the dynamo may operate as a high torque motor, said controller including automatic means for maintaining the connection between the ignition apparatus and current source while permitting certain of the field windings to be rendered ineffective.

6. In an electric system, the combination with an engine; of a dynamo having a plurality of field circuits and capable of operation as a motor for starting the engine or as a generator with certain of the field circuits operative; ignition apparatus for the engine; a storage battery; and a controller including manually operable means for connecting the battery with the ignition apparatus and with the dynamo and for bringing other of the field circuits into effective operation in order that the dynamo may operate as a high torque motor, said controller including automatic means for maintaining the connections between the ignition apparatus, battery and dynamo while permitting certain of the field windings to be rendered inoperative.

7. In an electrical system, the combination with an engine; of a dynamo having a plurality of field circuits and capable of operation as a motor for starting the engine or as a generator with certain of the field circuits operative; a storage battery; and a controller including a manually operable member, an armature and an electromagnet having magnet windings, said manual member having provisions to effect the movement of the armature to effect the connection of the battery and dynamo and provisions for bringing certain field circuits into effective operation whereby the dynamo will operate as a high torque motor to start the engine, said magnet windings being arranged that when the dynamo is generating the armature will be automatically maintained in circuit closing position while permitting the manual member to be released whereby to render certain of the field circuits inoperative.

8. In an electrical system, the combination with an engine and a dynamo electric machine capable of operation as a motor or as a generator, and having a plurality of field windings; a current source; circuit connections between the machine and current source including a switch for bringing certain of the field windings into operation, and a second switch in normal position causing other of the field windings to be ineffective; a common operating member for moving the switches into positions for bringing the windings into effective relation for motor operation; and electro-magnetic means acting automatically upon the operation of the machine as a generator for maintaining the first switch in said position, while permitting the release of the operating member to allow the return of the second switch to normal position.

9. In an electrical system, the combination with an engine; of a dynamo having a plurality of field circuits and capable of operation as a motor to start the engine or as a generator with certain field circuits operative; a storage battery; means for automatically maintaining connection between the dynamo and the battery when the generator output exceeds a certain value and for disconnecting the battery from the generator when the output falls below a certain value; and manually operable means cooperating therewith for connecting the battery with the dynamo and for bringing certain other of the field circuits into effective operation.

10. In an electrical system, the combination with an engine; of a dynamo having a plurality of field circuits and capable of operation as a motor to start the engine or as a generator with certain field circuits operative; a storage battery; ignition apparatus for the engine; means for a automatically maintaining connection between the dynamo, ignition apparatus and the battery when the generator output exceeds a certain value and for disconnecting the battery from the generator and ignition apparatus when the output falls below a certain value; and manually operable means cooperating therewith for connecting the battery with the dynamo and ignition apparatus and for bringing certain other of the field circuits into effective operation.

11. In an electrical system, the combination with an engine; of a dynamo having a plurality of field circuits and capable of operation as a motor for starting the engine or as a generator with certain of the field circuits operative; a storage battery; and a controller for connecting the battery with the dynamo and for bringing other of the field circuits in effective operation in order that the dynamo may operate as a high torque motor, said controller including automatic means for maintaining the dynamo connected with the battery when the dynamo output exceeds a certain amount and an independently movable handle for rendering certain of the field windings ineffective.

12. In an electrical system, the combination with an engine; of a dynamo connected thereto, said dynamo having shunt and series field windings and being capable of operation as a motor to start the engine or as a generator driven thereby; a storage battery adapted to be connected in circuit with the dynamo; an ignition circuit for the engine; means including a switch for automatically controlling the main circuit connections between the battery and dynamo and between the battery and ignition circuit; said means having provisions for rendering certain of said field windings inoperative under stated conditions of operation whereby the motoring characteristics of said dynamo will differ from its generating characteristics; and means independent of said first-mentioned means for rendering the ignition circuit ineffective.

13. In an electric plant for charging storage batteries; the combination of an engine; ignition means therefor; a dynamo-electric machine driven thereby; a storage battery adapted to be connected in circuit with said dynamo-electric machine to be charged thereby; a main switch in said circuit; magnetic means for holding the main switch closed comprising a low-resistance winding in series with said circuit and a high-resistance winding having one end connected with said circuit between the generator and said main switch and the other end connected with said circuit between the generator and the battery; and means dependent upon the continued operation of the engine and operating automatically to stop the engine and to modify the magnetic action of said magnetic means whereby to open said main switch.

14. In an electric plant for charging storage batteries; the combination of an engine; ignition means therefor; a dynamo-electric machine driven thereby; a storage battery adapted to be connected in circuit with said dynamo-electric machine to be charged thereby; and controlling means comprising a main switch in said circuit, magnetic means for holding the main switch closed, said magnetic means including a series winding in series with said circuit and a shunt winding connected across the terminals of the dynamo-electric machine, said controlling means being responsive to the state of charge of the battery and operating automatically to stop the engine and to reduce the magnetic strength of the magnetic means whereby to open said main switch.

15. In an electric plant for charging storage batteries; the combination of an engine; ignition means therefor; a dynamo-electric machine driven thereby; a storage battery adapted to be connected in circuit with said dynamo-electric machine to be charged thereby; and controlling means comprising a main switch in said circuit, magnetic means for holding the main switch closed, said magnetic means including a series winding in series with said circuit and a shunt winding connected across the terminals of the dynamo-electric machine, said controlling means being responsive to the state of charge of the battery and operating automatically to open the ignition circuit to stop the engine and to reduce the magnetic strength of the magnetic means whereby to open said main switch.

16. In an electric plant for charging storage batteries; the combination of an engine; ignition means therefor; a dynamo-electric machine driven thereby; a storage battery adapted to be connected in circuit with said dynamo-electric machine to be charged thereby; and controlling means comprising a main switch in said circuit, means for closing said switch, electro-magnetic means for holding said switch closed, said closing means and said holding means being so arranged that said closing means can be restored to its open position without opening said switch, said controlling means being responsive to the state of charge of the battery and operating automatically to stop the engine and to reduce the magnetic strength of the magnetic means whereby to open said main switch.

17. In combination, a generator, a storage-battery, a current meter, an electric circuit including said generator, storage battery and current meter, an electro-magnet, an armature therefor constituting a switch adapted, when the electro-magnet is energized, to maintain said circuit closed, means for energizing said electro-magnet operative only when said circuit is closed, manual means for moving said armature to close the switch and means controlled by said meter for impeding said electro-magnet energizing means.

18. In combination, a gas engine, an ignition circuit therefor, a generator, a driving connection between the engine and generator, a storage battery, a current meter, and electric circuit including said generator, storage battery and current meter, an electro-magnet, an armature therefor constituting a switch adapted, when the electro-magnet is energized, to maintain said last named circuit and said ignition circuit closed, means for energizing said electro-magnet operative when said circuit is closed, manual means for moving said armature to close the switch, and means controlled by said meter for impeding said electro-magnet energizing means.

19. In a combination, a generator, a storage battery, a current meter, an electro-magnet having a series and a shunt coil, an electric circuit including said generator, storage battery, current meter, and magnet series coil, an armature for said magnet constituting a switch adapted to maintain said circuit closed when the series and shunt coils are energized, manual means for moving said armature to close the switch, means for energizing said shunt coil, and means controlled by said current meter for interfering with said energizing means.

20. In combination, a gas engine, an ignition circuit therefor, a dynamo-electric machine, a driving connection between the gas engine and dynamo-electric machine, a current source, a current meter, an electro-magnet having a series and a shunt coil, an electric circuit including said dynamo-electric machine, current source, current meter and magnet series coil, an armature for said magnet constituting a switch adapted, when both coils of the electro-magnet are energized, to maintain said last named circuit and said ignition circuit closed, manual means for moving said armature to close the switch, means for energizing said shunt coil and means controlled by said current meter for interrupting said energizing means.

In testimony whereof we affix our signatures.

CHARLES F. KETTERING.
WILLIAM A. CHRYST.